US010726082B2

(12) United States Patent
Chakra et al.

(10) Patent No.: US 10,726,082 B2
(45) Date of Patent: *Jul. 28, 2020

(54) SOCIAL NETWORKING INFORMATION CONSUMPTION GAP RESOLUTION

(71) Applicant: International Business Machines Corporation, Armonk, NY (US)

(72) Inventors: Al Chakra, Apex, NC (US); Liam S. Harpur, Dublin (IE); John C. Rice, Waterford (IE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/198,350

(22) Filed: Nov. 21, 2018

(65) Prior Publication Data

US 2019/0108281 A1    Apr. 11, 2019

Related U.S. Application Data

(63) Continuation of application No. 14/314,660, filed on Jun. 25, 2014, now Pat. No. 10,162,894, which is a
(Continued)

(51) Int. Cl.
*G06F 16/951* (2019.01)
*G06Q 50/00* (2012.01)
(Continued)

(52) U.S. Cl.
CPC ....... *G06F 16/951* (2019.01); *G06Q 30/0201* (2013.01); *G06Q 50/01* (2013.01); *H04L 67/22* (2013.01)

(58) Field of Classification Search
CPC ............ G06F 17/30864; G06F 16/951; G06Q 30/0201; G06Q 50/01; H04L 67/22
See application file for complete search history.

(56) References Cited

U.S. PATENT DOCUMENTS 7,765,279 B1    7/2010 Kaib et al.
8,612,211 B1    12/2013 Shires et al.
(Continued)

FOREIGN PATENT DOCUMENTS

CA    2603087 A1    10/2006
CA    2816560 A1    5/2012
(Continued)

OTHER PUBLICATIONS

Donald Lefebvre, Authorized Officer, Canadian Intellectual Property Office ISA/CA, International Search Report for Application No. PCT/CA2014/050587, dated Sep. 11, 2014, pp. 1-5, Gatineau, Quebec, CA.
(Continued)

*Primary Examiner* — John M MacIlwinen
(74) *Attorney, Agent, or Firm* — L. Jeffrey Kelly

(57) ABSTRACT

Social network content consumption activities of social network users related to content published by at least one social network are monitored. The monitored social network content consumption activities of each of at least two of the social network users are compared. A determination is made, based upon the comparison, that a difference in consumption of the published content exists between the at least two of the social network users. A notification is generated to any of the at least two of the social network users determined, based upon the difference in consumption, to have consumed less of the published content than at least one other social network user.

10 Claims, 5 Drawing Sheets

Related U.S. Application Data continuation of application No. 14/016,655, filed on Sep. 3, 2013, now abandoned.

(51) Int. Cl.
  G06Q 30/02 (2012.01)
  H04L 29/08 (2006.01)

(56) References Cited

U.S. PATENT DOCUMENTS

| | | | |
|---|---|---|---|
| 9,021,364 | B2 | 4/2015 | Nealer et al. |
| 9,509,732 | B2 | 11/2016 | Asver et al. |
| 9,596,207 | B1 | 3/2017 | Lin et al. |
| 2006/0174201 | A1 | 8/2006 | Zaner-Godsey et al. |
| 2008/0172412 | A1 | 7/2008 | Gruhl et al. |
| 2010/0049815 | A1 | 2/2010 | Vanecek et al. |
| 2011/0105095 | A1 | 5/2011 | Kedefors et al. |
| 2011/0113096 | A1 | 5/2011 | Long et al. |
| 2012/0095979 | A1 | 4/2012 | Aftab et al. |
| 2012/0203845 | A1 | 8/2012 | Lakshmanan et al. |
| 2013/0091450 | A1 | 4/2013 | Yi et al. |
| 2013/0325948 | A1 | 12/2013 | Chen et al. |
| 2014/0129505 | A1 | 5/2014 | Lin et al. |
| 2014/0136612 | A1 | 5/2014 | Redfern et al. |
| 2014/0200033 | A1 | 7/2014 | Wheeler et al. |
| 2015/0066978 | A1 | 3/2015 | Chakra et al. |
| 2015/0067046 | A1 | 3/2015 | Chakra et al. |

FOREIGN PATENT DOCUMENTS

| | | |
|---|---|---|
| CN | 1287640 A | 3/2001 |
| CN | 101047654 A | 10/2007 |
| CN | 101977238 A | 2/2011 |
| JP | 14-043274 A | 8/2003 |
| JP | 2003242071 A | 8/2003 |
| JP | 15-432794 A | 7/2005 |
| JP | 2005190314 A | 7/2005 |
| JP | 2005190315 A | 7/2005 |
| WO | 03041033 A1 | 5/2003 |
| WO | 2007081958 A2 | 7/2007 |
| WO | 2011136786 A1 | 11/2011 |
| WO | 2012138574 A1 | 10/2012 |
| WO | 2013055957 A1 | 4/2013 |
| WO | 2013089671 A1 | 6/2013 |
| WO | 2013089672 A2 | 6/2013 |

OTHER PUBLICATIONS

Donald Lefebvre, Authorized Officer, Canadian Intellectual Property Office ISA/CA, Written Opinion for Application No. PCT/CA2014/050587, dated Sep. 11, 2014, pp. 1-8, Gatineau, Quebec, CA.

Author Unknown, State Intellectual Property Office, P.R.China, Examination Report for Chinese Application No. CN201480047235.4 (English translation not available), dated Feb. 24, 2018, pp. 1-6, P.R. China.

Author Unknown, Examination Report for JP Patent Application Serial No. 26-537059, Publication No. JP2016533587 (English translation not available), Japan Patent Office, Apr. 4, 2018, pp. 1-4, Japan.

United States Patent and Trademark Office, Office Action for U.S. Appl. No. 14/016,655, dated Jun. 12, 2015, pp. 1-23, Alexandria, VA, USA.

United States Patent and Trademark Office, Office Action for U.S. Appl. No. 14/016,655, dated Dec. 16, 2015, pp. 1-21, Alexandria, VA, USA.

United States Patent and Trademark Office, Office Action for U.S. Appl. No. 14/016,655, dated Apr. 13, 2016, pp. 1-25, Alexandria, VA, USA.

United States Patent and Trademark Office, Office Action for U.S. Appl. No. 14/016,655, dated Oct. 7, 2016, pp. 1-24, Alexandria, VA, USA.

United States Patent and Trademark Office, Notice of Abandonment for U.S. Appl. No. 14/016,655, dated Apr. 24, 2017, pp. 1-2, Alexandria, VA, USA.

United States Patent and Trademark Office, Office Action for U.S. Appl. No. 14/314,660, dated Jun. 10, 2015, pp. 1-21, Alexandria, VA, USA.

United States Patent and Trademark Office, Office Action for U.S. Appl. No. 14/314,660, dated Dec. 16, 2015, pp. 1-18, Alexandria, VA, USA.

United States Patent and Trademark Office, Office Action for U.S. Appl. No. 14/314,660, dated Apr. 7, 2016, pp. 1-24, Alexandria, VA, USA.

United States Patent and Trademark Office, Office Action for U.S. Appl. No. 14/016,655, dated Jun. 7, 2017, pp. 1-22, Alexandria, VA, USA.

United States Patent and Trademark Office, Office Action for U.S. Appl. No. 14/016,655, dated Nov. 1, 2017, pp. 1-20, Alexandria, VA, USA.

United States Patent and Trademark Office, Advisory Action for U.S. Appl. No. 14/016,655, dated Jan. 29, 2018, pp. 1-8, Alexandria, VA, USA.

United States Patent and Trademark Office, Office Action for U.S. Appl. No. 14/016,655, dated Mar. 20, 2018, pp. 1-22, Alexandria, VA, USA.

United States Patent and Trademark Office, Notice of Allowance for U.S. Appl. No. 14/016,655, dated Aug. 16, 2018, pp. 1-15, Alexandria, VA, USA.

David J. Kappos, Subject Matter Eligibility of Computer Readable Media, Memo, United States Patent and Trademark Office, Jan. 2010, p. 1, Alexandria, VA, USA.

SOCIAL NETWORKING INFORMATION CONSUMPTION GAP RESOLUTION

BACKGROUND

The present invention relates to multi-user social network information consumption. More particularly, the present invention relates to social networking information consumption gap resolution.

Social networks provide social network users/contacts with a capability to communicate within an online environment to share information, such as photographs, stories, and other information. Social network users may coordinate events, such as school reunions and other events using social networks.

SUMMARY

A method includes: monitoring, by a processor, social network content consumption activities of social network users related to content published via at least one social network; comparing the monitored social network content consumption activities of each of at least two of the social network users; determining, based upon the comparison, that a difference in consumption of the published content exists between the at least two of the social network users; and generating a notification to any of the at least two of the social network users determined, based upon the difference in consumption, to have consumed less of the published content than at least one other social network user.

A system includes a communication module; and a processor programmed to: monitor, using the communication module, social network content consumption activities of social network users related to content published via at least one social network; compare the monitored social network content consumption activities of each of at least two of the social network users; determine, based upon the comparison, that a difference in consumption of the published content exists between the at least two of the social network users; and generate a notification to any of the at least two of the social network users determined, based upon the difference in consumption, to have consumed less of the published content than at least one other social network user.

A computer program product includes a computer readable storage medium having computer readable program code embodied therewith, where the computer readable program code when executed on a computer causes the computer to: monitor social network content consumption activities of social network users related to content published via at least one social network; compare the monitored social network content consumption activities of each of at least two of the social network users; determine, based upon the comparison, that a difference in consumption of the published content exists between the at least two of the social network users; and generate a notification to any of the at least two of the social network users determined, based upon the difference in consumption, to have consumed less of the published content than at least one other social network user.

DETAILED DESCRIPTION

Figure 1:
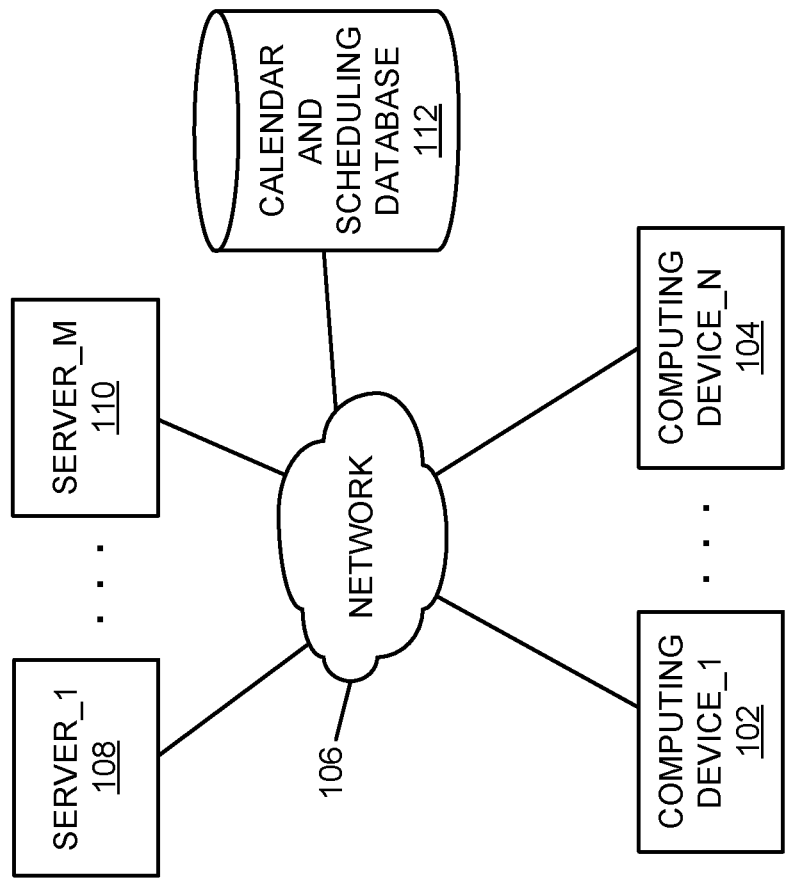
FIG. 1 is a block diagram of an example of an implementation of a system for social networking information consumption gap resolution according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides social networking information consumption gap resolution. The present technology monitors user activity and information consumption within a social networking environment, and monitors calendared events associated with a group of social network users. The present technology compares each user's level of social network content/information consumption, and identifies any information consumption gap(s). In response to determining that users are scheduled to meet and discuss a topic for which social content/information has been posted, the present technology alerts each user determined to have a gap between the user's social network content consumption and any remaining identified social network content to be consumed prior to the meeting. As such, the present technology provides a multi-directional alert and notification process to identify social network users of each other's postings and potential social network information consumption gaps. Users may be notified of information consumption gaps and provided with identifiers of any unconsumed social network content/information that may be relevant to a particular meeting discussion/topic. Accordingly, using the present technology, all users in the meeting may be informed of and provided with relevant up-to-date information posted by other users in attendance at the respective meeting.

To provide an example use of the present technology, it may be assumed that two social network users, a "UserA" and a "UserB," are scheduled to attend a meeting at a given time (e.g., 4:30 pm) to discuss a collaborative development project. By use of the present technology, the respective users may be notified of social network information consumption gaps as follows. If UserA has been active in a social network environment in the early afternoon (e.g., from 2:00 pm to 3:00 pm), the present technology monitors the social network postings made by the UserA during that timeframe, and identifies new postings that may be of relevance to the particular topic of the meeting. When UserB logs into in the social network environment later in the afternoon (e.g., at 4:00 pm), UserB may be alerted/notified that UserA has contributed new postings to the social network environment earlier in the afternoon at the given time(s). UserB may bridge the social network information gap by reviewing the new/earlier postings of UserA. Similarly, where UserB also contributes one or more new postings in the social network environment, the present technology monitors the social network postings made by the UserB, and identifies new postings that may be of relevance to the particular topic of the meeting. UserA may be alerted prior to the meeting of the new social network contributions of UserB, so that UserA may also bridge the social network information gap by reviewing the new postings of UserB. As such, both social network users may be alerted and updated with the relevant postings of the respective other social network user, and when the social network users meet they may advance their collaborative efforts with knowledge of all relevant information posted by each other (and without information gaps that may consume valuable meeting time to fill in). Accordingly, meeting time-efficiency management, collaboration of social network users, and collaborative group efficiency may all be improved by use of the present technology.

The technology described herein may be implemented, for example, as a social and collaborative application environment, alternatively termed a "social networking information consumption gap analysis" module. The social and collaborative application environment may be client-server based or may be stand alone with data feeds for information acquisition. Many alternatives exist for implementation of the present technology and all such alternatives are considered to be within the scope of the present subject matter.

The social and collaborative application environment actively monitors social networks for activity of social network users, and documents/notes user authentication times and length of activity (e.g., postings and published content viewing/reading). When a new meeting is recorded to a calendar and scheduling database, the social and collaborative application environment obtains a list of invitees to the meeting and begins a social network activity log for all social network users that are invitees to the meeting. The social network activity log includes the authentication times, length of activity, postings/content, and other information usable to identify social network information consumption gaps between the invitees to the meeting. As an alternative, depending on configuration options, the social and collaborative application environment may also include monitoring and social network activity logging for social network users that are closely associated in the social network to identify postings of relevance for social network information consumption gap analysis.

Over time, the social and collaborative application environment charts user social networking behavior (e.g., when users are online, when users log off for the day, when users take lunch, etc.) and reviews user meeting schedules. By analyzing and understanding each user's social networking behavior, the social and collaborative application environment may identify and set a "best time to alert" notification trigger for each social network user on a daily basis. As such, if the social and collaborative application environment determines that the UserA leaves for lunch somewhere between 12:00 pm and 2:00 pm on a Tuesday and has a meeting at 3:00 pm, then the social and collaborative application environment may determine to alert the UserA of information gaps associated with this meeting prior to 12:00 pm and potentially again at 2:30 pm, as appropriate for a given social networking information consumption gap analysis.

The social and collaborative application environment may obtain as inputs the agenda and/or heading of the meeting. The social and collaborative application environment may utilize the agenda and/or heading of the meeting to infer one or more "social media topics," and may search for social network postings related to the social media topic(s) within forums or other social media collaborative environments within which the users are actively participating. Postings made to social network environments by invitees to the meeting that are related to any of the social media topics may include information relevant to the meeting and to other invitees to the meeting. As described herein, other invitees may be notified of such postings so they may review the respective postings prior to the meeting.

The meeting creator may also tag specific social media topics within the meeting invitation. In such circumstances, the social and collaborative application environment may then utilize the tagged social media topics and monitor each social network user's level of participation in the respective social network(s) by recording times where users are active and are not active. When the social and collaborative application environment determines that a social network information consumption gap exists, it may flag the information/content associated with the identified consumption gaps so that it may be presented to other users at a given determined time or time period when the users are active in the social network environment. The presentation of information associated with identified social network information consumption gaps may be presented in a digest format to assist the respective social network users with expedient review of the information.

It should be noted that conception of the present subject matter resulted from recognition of certain limitations associated with social network information sharing among groups, such as product development teams. For example, it was observed that in situations where social networks are used to communicate regarding coordinated activities, such as development projects, many users may post information that is useful to further the collective goal of the group or the topic of a particular social network conversation. However, it was further observed that where a high number of social network members contribute to social network content regarding a particular topic, it may become difficult for each individual user to identify relevant/important information, and users may not have time to consume all of the content that is posted by other users. It was additionally observed that this social network information consumption problem may be compounded by respective users posting content and consuming posted content of other users at different times, which causes information consumption by individual users to be out of synchronization (e.g., out of phase) with one another. It was determined from these several observations that inefficiencies may result where the individual users lack information posted by other users, particularly where a relevant decision is pending or a meeting is being conducted to discuss the respective topic (e.g., progress of a project). It was further determined within this context that technology to identify social network information consumption gaps for individual users and to alert the respective users so that the users may synchronize (e.g., consume/read the relevant content) before meeting with one another may improve information sharing within social network environments. The present subject matter provides social networking information consumption gap resolution, as described above and in more detail below. As such, improved social network information sharing may be obtained through use of the present technology.

The social networking information consumption gap resolution described herein may be performed in real time to allow prompt presentation of information associated with identified social network information consumption gaps. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for social networking information consumption gap resolution. A computing device_1 102 through a computing device_N 104 communicate via a network 106 with a server_1 108 through a server_M 110. The computing device_1 102 through the computing device_N 104 and the server_1 108 through the server_M 110 may also communicate with a calendar and scheduling database 112.

As will be described in more detail below in association with FIG. 2 through FIG. 4B, the computing device_1 102 through the computing device_N 104 and the server_1 108 through the server_M 110 may each provide automated social networking information consumption gap resolution. The automated social networking information consumption gap resolution is based upon monitoring and analysis of social network postings in relation to topics of scheduled meetings between social network users, identification of social network information consumption gaps among the respective social network users, and notification (e.g., in digest format) to any social network user(s) determined to have a social network information consumption gap that, if not resolved prior to the meeting, may reduce efficiency of the scheduled meeting. The present technology may be implemented at a user computing device or server device level. A variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, a social networking server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The calendar and scheduling database 112 may include a relational database, an object database, or any other storage type of device. Alternatively, the calendar and scheduling database 112 may be implemented as a calendar and scheduling server with storage for social network user calendars and scheduling information. As such, the calendar and scheduling database 112 may be implemented as appropriate for a given implementation.

Figure 2:
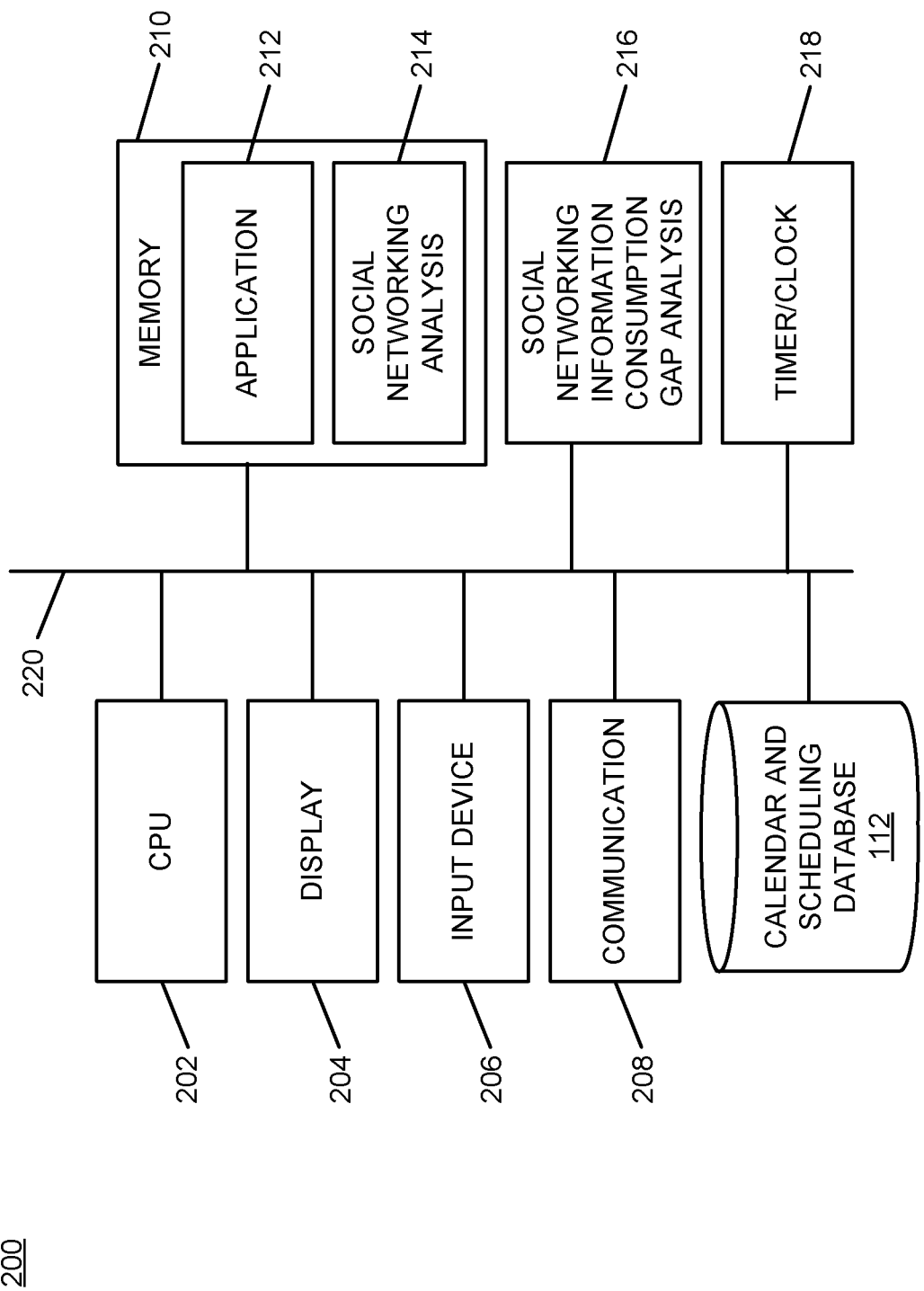
FIG. 2 is a block diagram of an example of an implementation of a core processing module capable of performing social networking information consumption gap resolution according to an embodiment of the present subject matter.

FIG. 2 is a block diagram of an example of an implementation of a core processing module 200 capable of performing social networking information consumption gap resolution. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of social networking information consumption gaps in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes an application storage and execution area 212 that stores and provides execution space for one or more applications, including a web browser or an application-specific application for access to one or more social networks, a calendar/scheduling application, and other applications for use in association with the core processing module 200. The memory 210 also includes a social networking analysis storage area 214 that stores information for one or more social network users, such as social network posting content, meeting topics (e.g., social media topics), authentication time(s) and durations, and other information usable to chart social networking behavior and identify social networking information consumption gaps.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A social networking information consumption gap analysis module 216 is also illustrated. The social networking information consumption gap analysis module 216 provides social networking user posting analysis relative to authentication times and meeting schedules for the core processing module 200, as described above and in more detail below. The social networking information consumption gap analysis module 216 implements the automated social networking information consumption gap resolution of the core processing module 200.

It should also be noted that the social networking information consumption gap analysis module 216 may form a portion of other circuitry described without departure from the scope of the present subject matter. Further, the social networking information consumption gap analysis module 216 may alternatively be implemented as an application stored within the memory 210. In such an implementation, the social networking information consumption gap analysis module 216 may include instructions executed by the CPU 202 for performing the functionality described herein. The CPU 202 may execute these instructions to provide the processing capabilities described above and in more detail below for the core processing module 200. The social networking information consumption gap analysis module 216 may form a portion of an interrupt service routine (ISR), a portion of an operating system, a portion of a browser application, or a portion of a separate application without departure from the scope of the present subject matter.

A timer/clock module 218 is illustrated and used to determine timing and date information, such as social network user authentication times/durations and meeting scheduling information, as described above and in more detail below. As such, the social networking information consumption gap analysis module 216 may utilize information derived from the timer/clock module 218 for information processing activities, such as the social networking information consumption gap resolution described herein.

The calendar and scheduling database 112 is again shown within FIG. 2 associated with the core processing module 200. As such, the calendar and scheduling database 112 may be operatively coupled to the core processing module 200 without use of network connectivity, as appropriate for a given implementation.

The CPU 202, the display 204, the input device 206, the communication module 208, the memory 210, the social networking information consumption gap analysis module 216, the timer/clock module 218, and the calendar and scheduling database 112 are interconnected via an interconnection 220. The interconnection 220 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the calendar and scheduling database 112 is illustrated as a separate component for purposes of example, the information stored within the calendar and scheduling database 112 may also/alternatively be stored within the memory 210 without departure from the scope of the present subject matter. Accordingly, the core processing module 200 may take many forms and may be associated with many platforms.

Figure 3:
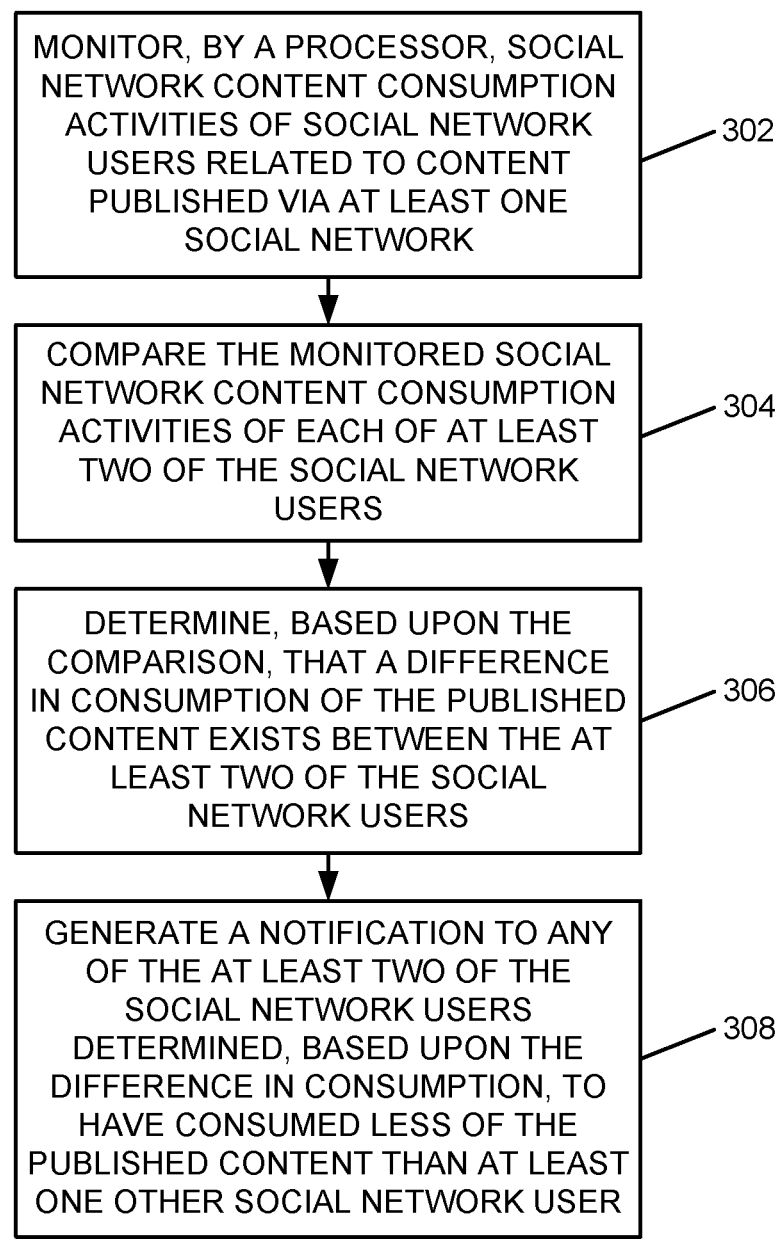
FIG. 3 is a flow chart of an example of an implementation of a process for social networking information consumption gap resolution according to an embodiment of the present subject matter.
Figure 4A:
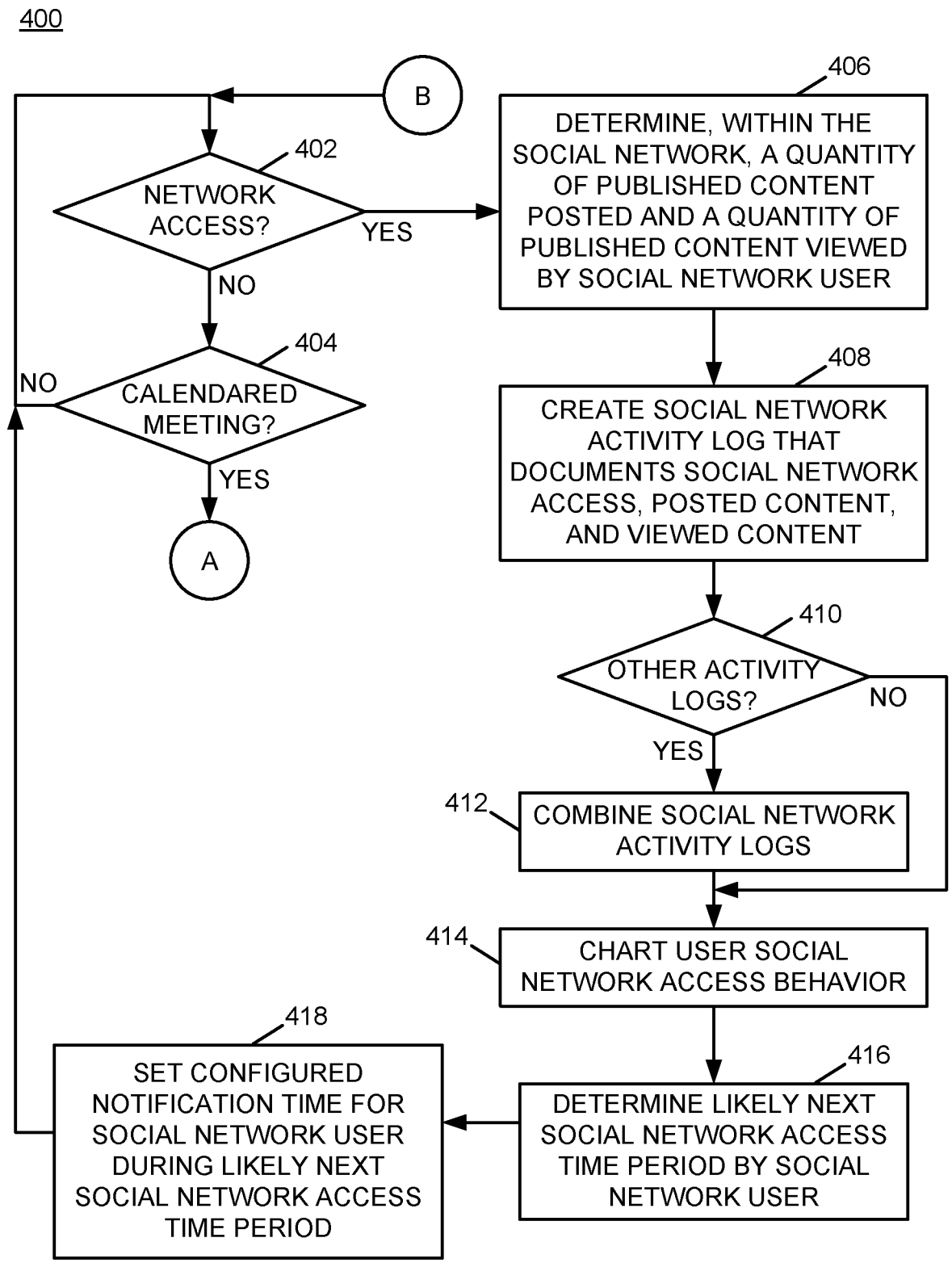
FIG. 4A is a flow chart of an example of an implementation of initial processing within a process that utilizes activity logs for social networking information consumption gap resolution according to an embodiment of the present subject matter.
Figure 4B:
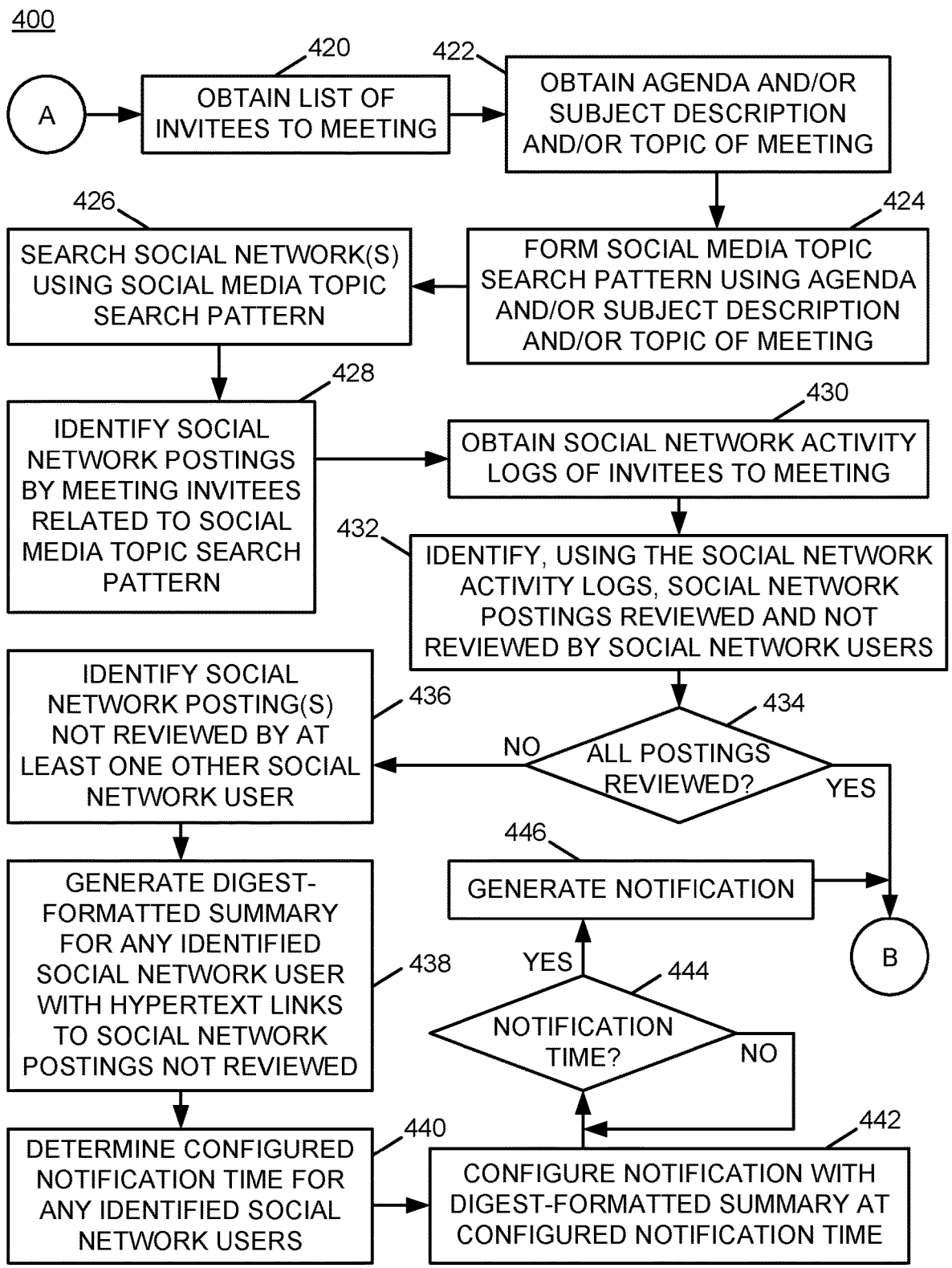
FIG. 4B is a flow chart of an example of an implementation of additional processing within a process that utilizes activity logs for social networking information consumption gap resolution according to an embodiment of the present subject matter.

FIG. 3 through FIG. 4B described below represent example processes that may be executed by devices, such as the core processing module 200, to perform the automated social networking information consumption gap resolution associated with the present subject matter. Many other variations on the example processes are possible and all are considered within the scope of the present subject matter. The example processes may be performed by modules, such as the social networking information consumption gap analysis module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for social networking information consumption gap resolution. At block 302, the process 300 monitors, by a processor, social network content consumption activities of social network users related to content published via at least one social network. At block 304, the process 300 compares the monitored social network content consumption activities of each of at least two of the social network users. At block 306, the process 300 determines, based upon the comparison, that a difference in consumption of the published content exists between the at least two of the social network users. At block 308, the process 300 generates a notification to any of the at least two of the social network users determined, based upon the difference in consumption, to have consumed less of the published content than at least one other social network user.

FIGS. 4A-4B illustrate a flow chart of an example of an implementation of process 400 for that utilizes activity logs social networking information consumption gap resolution. FIG. 4A illustrates initial processing within the process 400. The process 400 begins by iteratively monitoring social network postings and posting consumption by social network users, and monitoring calendared meetings/events to identify social network information consumption gaps. The higher-level iteration will be described first, followed by the processing in response to an affirmative determination at the respective decision points.

At decision point 402, the process 400 makes a determination as to whether a social network access by a social network user has been detected. In response to determining that a social network access by a social network user has not been detected, the process 400 makes a determination at decision point 404 as to whether an upcoming calendared meeting has been detected (e.g., scheduled for the current day). In response to determining at decision point 404 that an upcoming calendared meeting has not been detected, the process 400 returns to decision point 402 and iterates as described above. The processing described may be processed for each detected social network access by multiple social network users and for each detected calendared meeting.

In response to determining that a social network access by a social network user has been detected at decision point 402, the process 400 determines, within the respective social network(s), a quantity of published content posted and a quantity of published content viewed by each of at least two of the social network users at block 406. At block 408, the process 400 creates a social network activity log that documents the detected user social network access to the respective social network(s), the determined quantity of the published content posted, and the determined quantity of published content viewed by each of the social network users.

At decision point 410, the process 400 makes a determination as to whether another social network activity log for the respective social network user exists. In response to determining that another social network activity log for the respective social network user exists, the process 400 combines the social network activity logs into a single social network activity log for the respective social network user at block 412. As such, the process 400 may document multiple social network accesses for each social network user.

In response to combining the social network activity logs into a single social network activity log for the respective social network user at block 412, or in response to determining that another social network activity log for the respective social network user does not exist at decision point 410, the process 400 charts user social network access behavior for the respective social network user at block 414. The charting may include charting, across a number of days, user social networking access behavior of each social network user, and may include using the social network activity log for the user that is updated over time. The charting of the user social networking access behavior may be utilized, for example as described above, to determine notification times at which to notify the social network users of identified gaps in social network information consumption.

As such, at block 416, the process 400 determines a likely next social network access time period by the social network user. As described above, the process 400 may determine a likely next social network access time period prior to a calendared meeting of any social network user determined to have consumed less of the published content than at least one other social network user. The determination of the likely next social network access time period prior to a calendared meeting may be based upon the charted user social network access behavior relative to the respective calendared meeting. At block 418, the process 400 sets a configured notification time during the determined likely next social network access time period. The configured notification time may be configured to notify the social network user prior to a calendared meeting, and be configured to generate the notification for the any of social network users determined to have consumed less of the published content than at least one other social network user. The process 400 returns to decision point 402 and iterates as described above.

Returning to the description of decision point 404, in response to determining that an upcoming calendared meeting has been detected, the process 400 transitions to the processing shown and described in association with FIG. 4B.

FIG. 4B illustrates additional processing associated with the process 400 that utilizes activity logs for social networking information consumption gap resolution. At block 420, the process 400 obtains, in response to detecting the calendared meeting, a list of invitees to the calendared meeting. At block 422, the process 400 obtains at least one of an agenda and/or a subject description and/or a topic of the calendared meeting. The respective one or more of the agenda, the subject description, and the topic of the calendared meeting may be analyzed and processed to derive/infer a social media topic search pattern.

At block 424, the process 400 forms a social media topic search pattern based upon one or more of the agenda, the subject description, and the topic of the calendared meeting. The social media topic search pattern may be used to search social networks, and to identify and resolve social networking information consumption gaps.

At block 426, the process 400 searches the respective social network(s) using the social media topic search pattern. At block 428, the process 400 identifies, via the search using the social media topic search pattern, related social network postings by the respective social network users within the respective social network(s). At block 430, the process 400 obtains social network activity logs that document detected user social network accesses to the respective social networks, the determined quantity of published content posted, and the determined quantity of published content viewed by each of the respective social network users on the invitee list. At block 432, the process 400 identifies social network postings related to the social media topic search pattern (e.g., topic of the meeting) that have been reviewed and that have not been reviewed by the respective social network users. The process 400 may, for example, compare the postings made by each social network user with postings reviewed by each other social network user to identify postings that have not been reviewed by any social network users. As such, the process 400 compares monitored social network content consumption activities of each of the social network users to identify social network information consumption gaps.

At decision point 434, the process 400 makes a determination as to whether all postings related to the topic of the social media topic search pattern (e.g., topic of the meeting) have been reviewed by all other invitees to the meeting. In response to determining that all postings related to the topic of the social media topic search pattern (e.g., topic of the meeting) have been reviewed by all other invitees to the meeting, and that there is no social network information consumption gap for the respective meeting, the process 400 returns to the processing described above in association with FIG. 4A at decision point 402 and iterates as described above.

Alternatively, in response to determining that all postings related to the topic of the social media topic search pattern (e.g., topic of the meeting) have not been reviewed by all other invitees to the meeting, and that there is a social network information consumption gap for the respective meeting, the process 400 identifies at least one item of the published content posted by at least one other social network user (invitee) that has not been reviewed and that represents the determined difference in social network consumption at block 436. As such, the process 400 identifies any social network information consumption gap as specific social network postings of other invitees to the meeting that have not been reviewed by other invitees.

At block 438, the process 400 generates a digest-formatted summary, that represents the difference in social network consumption, that includes one or more hypertext links to the identified individual social network postings posted by any other social network user. At block 440, the process 400 determines a configured notification time for any social network users for which the social network information consumption gap has been identified. At block 442, the process 400 configures a notification with the generated digest-formatted summary at the configured notification time for the respective social network user(s).

At decision point 444, the process 400 makes a determination for each social network user associated with an identified social network information consumption gap as to whether any of the respective notification time(s) have occurred, such as by use of the timer/clock module 218. In response to determining for each such social network user that the respective configured notification time(s) have occurred, the process 400 generates the respective notification(s) at block 446 to notify the respective social network users to review the respective social network postings that have not yet been reviewed prior to the meeting. The process 400 returns to the processing described above in association with FIG. 4A at decision point 402 and iterates as described above.

As such, the process 400 monitors social network accesses (e.g., access and authentication times) and monitors social network postings by individual social network users. The process 400 also monitors social network postings reviewed by individual social network users and calendared meetings scheduled for multiple social network users. In response to determining that a scheduled meeting is approaching, the process 400 identifies any postings related to the meeting (e.g., by topic, etc.) that have not been reviewed by any meeting participant(s), which represent social network information consumption gaps. The process 400 notifies each social network user of the respective social network postings that are related to the meeting so that each social network user may review the related social network postings prior to the meeting. As such, meeting efficiency and meeting time management may be improved by use of the present technology.

As described above in association with FIG. 1 through FIG. 4B, the example systems and processes provide social networking information consumption gap resolution. Many other variations and additional activities associated with social networking information consumption gap resolution are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product, comprising:
a computer readable storage medium having computer readable program code embodied therewith, where the computer readable storage medium is not a transitory signal per se and where the computer readable program code when executed on a computer of at least one social networking server operative to provide a server-based social network platform service that reduces bandwidth consumption and improves information sharing throughput within at least one social network causes the computer to:

detect a calendared meeting within the at least one social network;

iteratively search, over time as processor-initiated within the at least one social networking server, the at least one social network for social network content postings related to a topic of the calendared meeting using a social media topic search pattern formed from the topic of the calendared meeting;

detect as a correlated set, for each social network user on a list of invitees to the calendared meeting, each of: (i) social network content postings identified from the iterative processor-initiated searching as related to the topic of the calendared meeting that are asynchronously posted by the respective social network user, and (ii) review by the respective social network user of the social network content postings identified from the iterative processor-initiated searching as related to the topic of the calendared meeting that are asynchronously posted by other social network users on the list of invitees to the calendared meeting;

determine, from the correlated set of social network content postings related to the topic of the calendared meeting that are posted and reviewed by each social network user on the list of invitees, that a difference exists between the review of the social network content postings related to the topic of the calendared meeting by at least two social network users on the list of invitees; and generate a notification that alerts any of the at least two of the social network users on the list of invitees determined to have reviewed fewer of the social network content postings related to the topic of the calendared meeting than at least one other social network user, where each notification provides a link to each posting related to the topic of the calendared meeting that has not been reviewed by the respective notified social network user, and where, by providing the notification to the respective social network users, the at least one social networking server reduces bandwidth consumption that would otherwise be consumed by individual searches for the social network content postings related to the topic of the calendared meeting and improves the information sharing throughput of the at least one social network.

2. The computer program product of claim 1, where, in causing the computer to detect the correlated set, the computer readable program code when executed on the computer causes the computer to:

detect, in association with each social network user on the list of invitees to the calendared meeting, social network user accesses using the at least one social networking server associated with the at least one social network to the social network content postings related to the topic of the calendared meeting within the at least one social network;

determine, within the at least one social network, which of the social network content postings related to the topic of the calendared meeting have been reviewed by each social network user on the list of invitees to the calendared meeting; and create a social network activity log that documents for each social network user: (1) the detected social network user accesses using the at least one social networking server associated with the at least one social network to the social network content postings related to the topic of the calendared meeting within the at least one social network, (2) the quantity of the social network content postings posted by the respective social network user, and (3) which of the social network content postings related to the topic of the calendared meeting have been reviewed by the respective social network user.

3. The computer program product of claim 1, where the computer readable program code when executed on the computer further causes the computer to:

monitor calendared meetings associated with the social network users and posted within the at least one social network via the at least one social networking server;

obtain, from the at least one social networking server, the list of invitees and one of an agenda or a heading specified for the calendared meeting;

programmatically infer the topic of the calendared meeting as at least one social media topic related to the calendared meeting from one of the agenda and the heading specified for the calendared meeting; and form the social media topic search pattern using the at least one inferred social media topic related to the calendared meeting.

4. The computer program product of claim 1, where the computer readable program code when executed on the computer further causes the computer to, as part of detecting the correlated set:

obtain, from the at least one social networking server, social network activity logs that document for each social network user: (1) detected social network user accesses using the at least one social networking server to the social network content postings related to the topic of the calendared meeting within the at least one social network, (2) the quantity of the social network content postings posted by the respective social network user, and (3) which of the social network content postings related to the topic of the calendared meeting have been reviewed by the respective social network user; and determine, using the social network activity logs for each social network user on the list of invitees to the calendared meeting, whether each other social network user on the list of invitees to the calendared meeting has reviewed published content related to at least one inferred social media topic of the calendared meeting posted via the at least one social networking server to the at least one social network by the other social network users.

5. The computer program product of claim 1, where, in causing the computer to generate the notification that alerts any of the at least two of the social network users on the list of invitees determined to have reviewed fewer of the social network content postings related to the topic of the calendared meeting than at least one other social network user, the computer readable program code when executed on the computer causes the computer to:

generate, for each social network user determined to have reviewed fewer of the social network content postings related to the topic of the calendared meeting than the at least one other social network user, a digest-formatted summary that comprises the link to each posting related to the topic of the calendared meeting that has not been reviewed by the respective notified social network user; and send each digest-formatted summary to the respective social network user determined to have reviewed fewer of the social network content postings related to the topic of the calendared meeting than the at least one other social network user; and the computer readable program code when executed on the computer further causes the computer to:
monitor review of each posting on each digest-formatted summary by the respective notified social network user.

6. The computer program product of claim 1, where the computer readable program code when executed on the computer further causes the computer to:
chart, across a plurality of days, user social network access behavior of each of the at least two of the social network users on the list of invitees via at least one social networking server;
determine, based upon the charted user social network access behavior relative to the calendared meeting, a likely next social networking server access time period prior to the calendared meeting of any of the at least two of the social network users on the list of invitees determined to have reviewed fewer of the social network content postings related to the topic of the calendared meeting than the at least one other social network user; and
set a configured notification time during the determined likely next social networking server access time period prior to the calendared meeting at which to generate the notification to any of the at least two of the social network users on the list of invitees determined to have reviewed fewer of the social network content postings related to the topic of the calendared meeting than the at least one other social network user.

7. The computer program product of claim 1, where, in causing the computer to generate the notification that alerts any of the at least two of the social network users on the list of invitees determined to have reviewed fewer of the social network content postings related to the topic of the calendared meeting than the at least one other social network user, the computer readable program code when executed on the computer causes the computer to:
generate, at a configured notification time during a determined likely next social networking server access time period prior to the calendared meeting, the notification to any of the at least two of the social network users on the list of invitees determined to have reviewed fewer of the social network content postings related to the topic of the calendared meeting than the at least one other social network user.

8. The computer program product of claim 1, where, in being operative to provide the server-based social network platform service that reduces the bandwidth consumption and improves the information sharing throughput within the at least one social network, the computer is operative in association with a social networking information consumption gap analysis module within a social and collaborative application environment formed among a plurality of social networking servers that collaborate and interoperate to provide the server-based social network platform service.

9. The computer program product of claim 1, where, in causing the computer to detect the correlated set, the computer readable program code when executed on the computer causes the computer to:
document user authentication times and a length of activity of each social network user on the list of invitees associated with at least one social networking server.

10. The computer program product of claim 1, where the calendared meeting comprises a tag that specifies at least one social media topic, and where the computer readable program code when executed on the computer further causes the computer to:
monitor each social network user's level of participation with respect to the social media topic in the respective at least one social network by recording times that each social network user on the list of invitees are active and are not active within the respective at least one social network in relation to the social media topic.

* * * * *